C. I. E. MASTIN.
PACKING AND METHOD OF MAKING SAME.
APPLICATION FILED MAY 27, 1920.
1,372,529.
Patented Mar. 22, 1921.
2 SHEETS—SHEET 2.
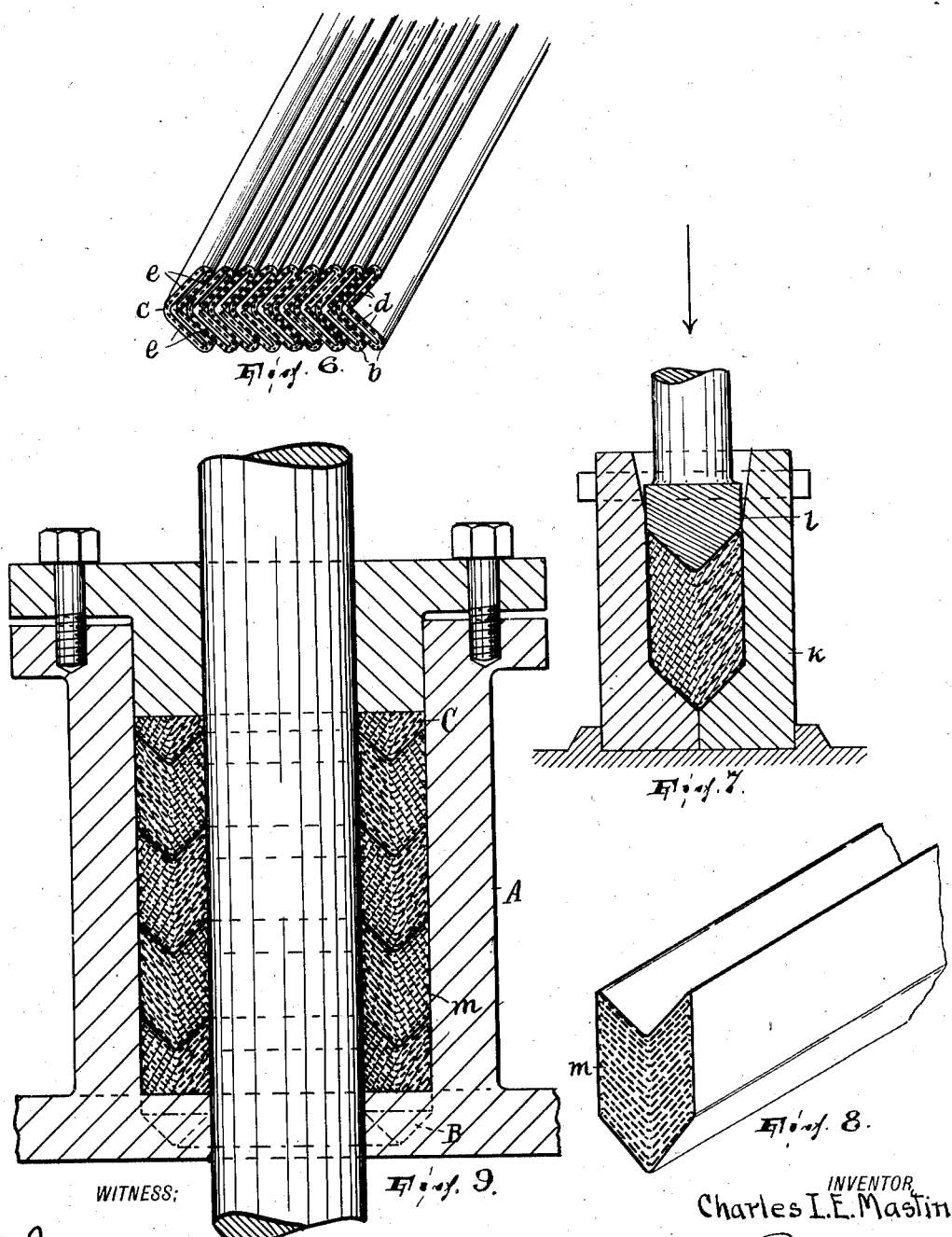

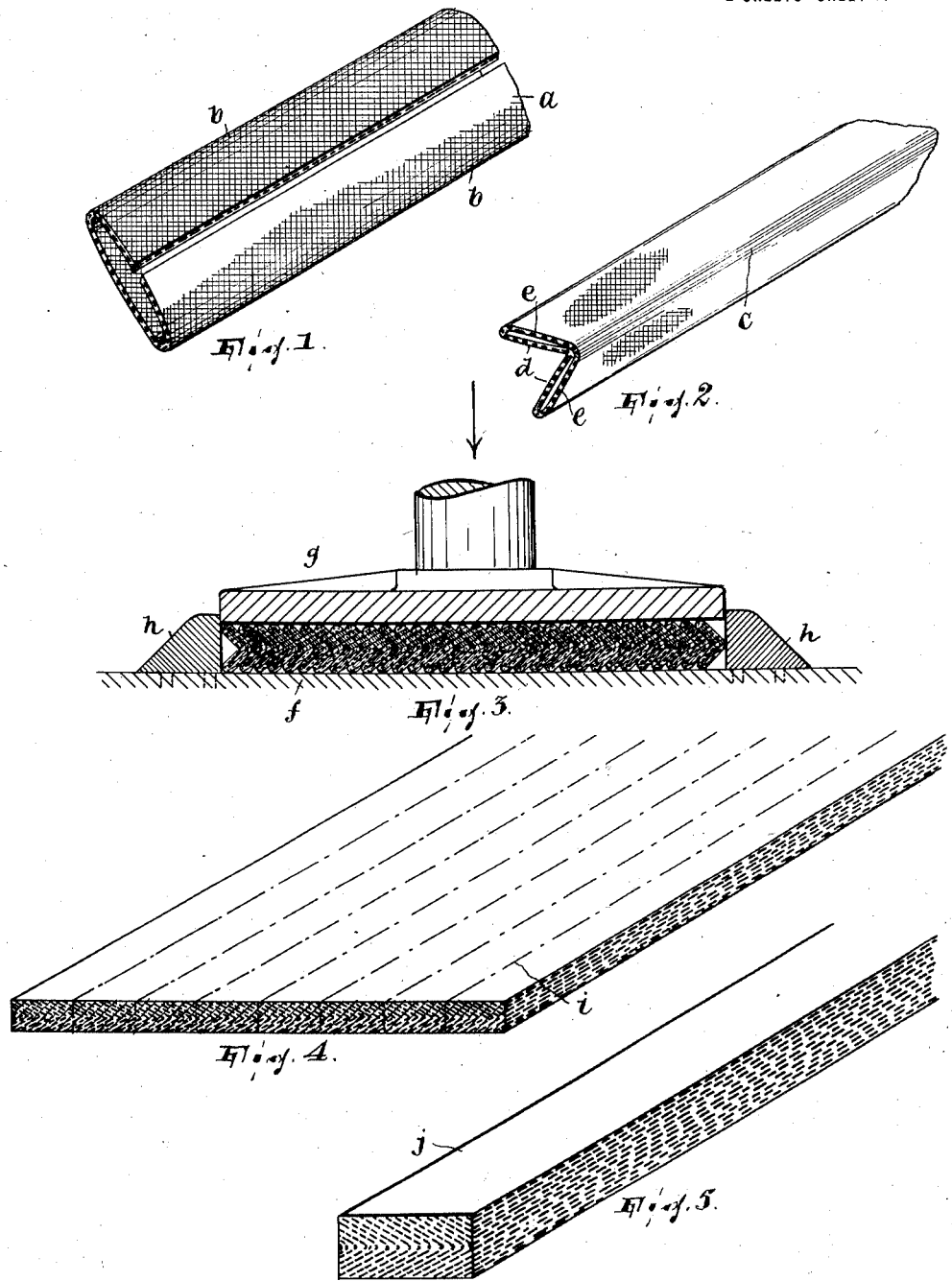

UNITED STATES PATENT OFFICE.

CHARLES I. E. MASTIN, OF MIDLAND PARK, NEW JERSEY.

PACKING AND METHOD OF MAKING SAME.

1,372,529.  Specification of Letters Patent.  Patented Mar. 22, 1921.

Application filed May 27, 1920. Serial No. 384,751.

*To all whom it may concern:*

Be it known that I, CHARLES I. E. MASTIN, a citizen of the United States, residing at Midland Park, in the county of Bergen and State of New Jersey, have invented certain new and useful Improvements in Packing and Methods of Making Same, of which the following is a specification.

It has been proposed (U. S. patent to Miller, No. 1,313,320) to provide a packing for piston-rod stuffing boxes or glands and the like which will include layers of suitable material as of fabric in the presence of rubber, in convergent planes, thus to produce certain desirable results, and in particular a tendency of the packing when subjected to pressure forces operating toward and opposite to the direction of convergence to expand transversely against the sides of the space packed and so augment the seal formed.

The object of this invention is to provide a packing of this kind that will be sturdier, stronger and more durable than such packings as heretofore proposed to be made; also to improve the method of manufacture of such packings.

In my improved packing the elements composing it are layers of flexible material, as a woven fabric, say duck, all bent longitudinally into substantially V-shaped form and nested in each other with the apex of each within its neighbor, and a suitable binder, as rubber, which unites, cements or permanently joins all the layers in any way characterizing packings of many forms composed of rubber and fabric or the like layers, each of the layers of my packing, however, being distinguished by bends or folds at its lateral margins, in the case hereinafter shown and described by way of illustration being produced by folding or bending inwardly the margins of the piece from which the layer is formed.

My improvement in the method of forming packings of the class to which my improved packing, thus briefly explained, relates consists in bending layers of flexible material into V-shaped form, placing them in nested relation to each other with the apex of each within its neighbor and with an adhesive or binder, as rubber, between adjoining layers, as by impregnating them or charging them with the same, and then exerting pressure upon all the layers in a direction relatively crosswise of their convergence. Preferably while the pressure is being exerted, if rubber or other vulcanizable material is the binding medium, they are also vulcanized. The resultant product is a slab or plate in which, viewed edgewise as to either of two opposite edges, the layers are now all bound together and will usually have greater or more acute convergence than originally. It will be an economy in procedure to form this pad or plate not as a mere strip but of considerable width and then cut the same in strips on lines parallel with the layers themselves, thus to form a number of packing strips or lengths of the desired width to suit some particular size of space to be packed.

My improved packing may be formed either by the method thus stated (having first formed the hereinbefore mentioned bends or folds at the lateral margins of the layers), or (also having first formed such bends or folds) by a mold or press whose members present male and female V-shaped acting faces, in which case the product of the pressure will usually be strips or lengths as distinguished from plates or slabs.

In the drawings,

Figure 1 shows one of the layers with the aforesaid bends or folds at its lateral margins;

Fig. 2 shows said layer after it is bent or folded to the V-shape;

Fig. 3 shows how a number of layers, such, for example, as those shown in Figs. 1 and 2, may be pressed into a single unitary mass, to produce a slab or plate of any desired width, this view being illustrative of the principal step in my improved method;

Fig. 4 shows how the slab or plate, if of a width to form more than one strip, may be cut to produce several strips, and Fig. 5 shows one such strip;

Fig. 6 illustrates the manner of nesting the V-shaped layers;

Fig. 7 shows how the packing may be formed in another way, particularly when the product is a strip;

Fig. 8 shows the product of the method illustrated by Fig. 7; and

Fig. 9 shows how the packing, and particularly the packing strip shown in Fig. 8, may be utilized.

The following description of my improved packing is a description of the same in its best form. Suitable strips of fabric impregnated with uncured rubber or otherwise treated therewith so that both faces thereof have the rubber thereon are provided, the fabric being preferably cut on the bias. Then the lateral margins of each strip are folded toward each other so as to meet or nearly meet. This produces of each strip a layer, such as $a$ in Fig. 1, the lateral margins $b$ of which are folds or bends. Then these layers are folded each on a line parallel with its folds or bends $b$, as at $c$, so that the layer assumes a V-shaped form; see Fig. 2. In forming the fold $c$ it is preferable to do so so that the lateral edges of the original strip will be at the inside instead of the outside, as shown in Fig. 2. The several layers, thus formed V-shaped, are then nested into each other so that the apex of each is within its neighbor; see Fig. 3 or Fig. 6. Pressure is then exerted on the thus-nested layers, and while preserving them nested in some way. The result of this treatment will be a slab or plate in which the layers, by the pressure, are now bound together by adhesion in a solid unitary mass. If rubber is the binder or adhesive the pressing operation may be accompanied with heat, thus to vulcanize the product. The V-shaped layers exist in the mass in substantial parallelism with each other, as illustrated by Figs. 4 to 9. The layers are not only bound to each other, according to that form of my packing now being described, but the component parts thereof are bound to each other, as the leaves $d$ of each layer to the leaves $e$ thereof.

I may form the packing above described, or any packing in fact whose constituent layers are V-shaped (though they may not have the particular form of the layers in my said packing, and in particular any folds or bends $b$) and are nested so that the apex of the angle of each is within its neighbor, an adhesive or binder, as uncured rubber, being between the layers, by pressing the thus-nested group of layers between the members $f$ and $g$ (Fig. 3) of a press so that their lateral margins are respectively presented to said members and then, having provided suitable abutments $h$ opposite the end layers, so as to limit the spreading of the group, cause the members of the press to compress the group into a solid mass in which the several layers are adhesively bound together. If rubber is used as the adhesive, it will be understood that heat may accompany the pressure operation so as to vulcanize the slab forming the product. It will be an economy to form the slab so that it will have appreciable width, and then cut the same on the lines $i$ shown in Fig. 4, thus to produce strips $j$ (Fig. 5) of the proper size for use. These lines are preferably parallel with the layers, so that when the packing is subjected to pressure in use the desired spreading crosswise of the convergence may ensue.

My improved packing may be formed otherwise than by my improved method described above. Thus a group of the nested layers (Fig. 6), formed as illustrated in Fig. 2, may be placed in a mold $k$ (Fig. 7) shaped at the bottom to conform with the convex V-shaped end or face of the group, and then a plunger $l$, shaped to conform to the concave V-shaped end or face of the group, may be forced into the mold (in the presence of heat for vulcanizing, if rubber is the adhesive, the resultant product $m$ being shown in Fig. 8. The product in this case will usually be a strip, $i.\ e.$, a piece ready-formed as it issues from the press or mold to be entered into the stuffing box or gland A shown in Fig. 9. If the requirements of the stuffing box demand several of these strips and it is undesirable to leave any space therein unoccupied by packing, the V-shaped convex portion B of one of the strips may be cut off and placed in the V-shaped concave recess that will be left at the other end of the series of strips, as indicated at C.

Having thus fully described my invention, what I claim as new and desire to secure by Letters Patent is:—

1. A packing mass including V-shaped layers of flexible material having folds at their lateral margins and arranged nested in the mass with the apex of each within a neighboring layer, said layers being adhesively bound together.

2. A packing mass including strips having their lateral edges folded over and each such strip being folded longitudinally into V-shaped form and thus forming a V-shaped layer having marginal folds, the several layers being nested in the mass with the apex of each within a neighboring layer and adhesively bound together.

3. The hereindescribed method of forming a packing mass which consists in arranging V-shaped layers with a suitable adhesive intervening between them in nested disposition and with the apex of each within a neighboring layer and then subjecting the thus-nested layers to pressure operating crosswise of the convergence of the layers.

4. The hereindescribed method of forming a packing mass which consists in arranging V-shaped layers with a suitable adhesive intervening between them in nested disposition and with the apex of each within a neighboring layer, then subjecting the thus-nested layers to pressure operating crosswise of the convergence of the layers and finally dividing the mass into a plurality of mass-portions on a line or lines substantially parallel with the several layers.

In testimony whereof I affix my signature.

CHARLES I. E. MASTIN.